M. Reynolds,
Beer Cooler.

No. 102,041.      Patented Apr. 19, 1870.

Witnesses: Chas. H. Smith, Geo. A. Walker

Michael Reynolds

United States Patent Office.

MICHAEL REYNOLDS, OF NEW YORK, N. Y.

Letters Patent No. 102,041, dated April 19, 1870; antedated April 7, 1870.

IMPROVEMENT IN COOLING ALE AND BEER.

The Schedule referred to in these Letters Patent and making part of the same

*To all whom it may concern:*

Be it known that I, MICHAEL REYNOLDS, of the city and State of New York, have invented and made a new and useful Improvement in Cooling Ale and Beer; and I do hereby declare the following to be a full, clear, and exact description of the said invention, reference being had to the annexed drawing making part of this specification, wherein—

The same letters are applied to the corresponding parts.

Figure 1:
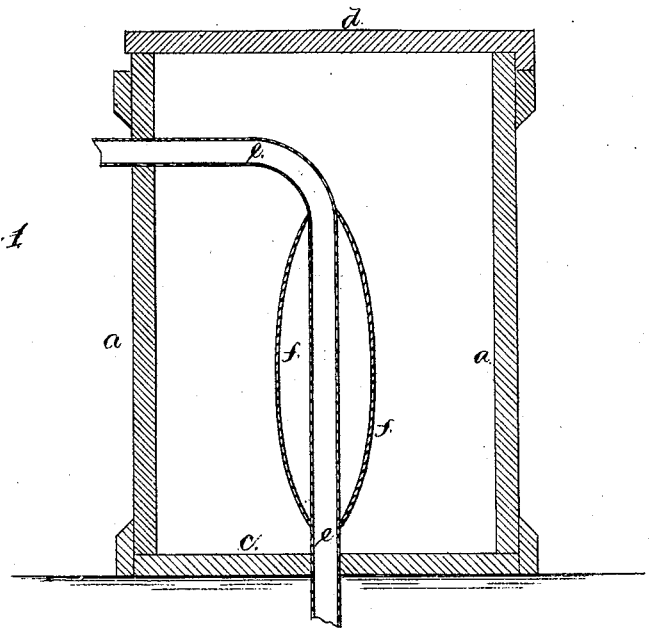
Figure 1 is a vertical section of the apparatus employed by me.
Figure 2:
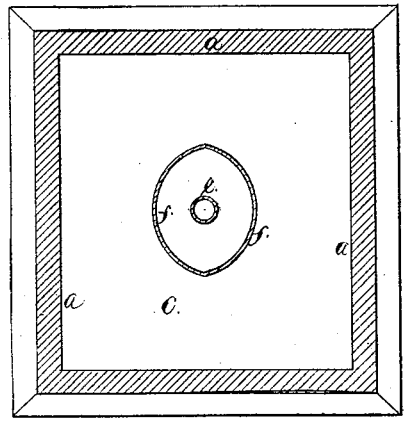
Figure 2 is a horizontal section of the ice-shield and beer pipe.

Beer and ales have heretofore been drawn through a tube or pipe within a refrigerator, the ice and ice-water coming directly into contact with the outside of the pipe. The extreme cold has a detrimental effect upon the beer, injuring the flavor of the same and checking the liberation of the gases that produce the frothing.

It is desirable that ale or beer, when drawn, should be of a temperature corresponding to that of a cellar or sub-cellar, so as to taste cool and refreshing without the icy-cold heretofore generally resulting from the action of a refrigerator.

The nature of my said invention consists in an ice-shield applied to the pipe, through which the beer or ale passes, so as to prevent the direct contact of the ice with the said pipe, and thereby to lessen the temperature in warm weather sufficient to give an agreeable flavor, but not to refrigerate the beer or ale and affect its flavor.

In the drawing—

$a$ represents the sides;

$c$, the bottom; and $d$, the top of a box to contain ice.

$e$ is a pipe leading from the beer barrel to the faucet or cock in any desired or well-known manner, and passing through the ice-box.

Within the ice-box the pipe $e$ is provided with a shield, $f$, that is attached at its ends to the pipe $e$, and I prefer to have it made air-tight, so as to exclude water of condensation or from the melting ice.

By means of the shield $f$ an air-space is left between the ice and the beer pipe, and this air being cooled acts like a cool cellar to reduce the temperature of the beer to the proper degree, and thus prevent the injurious effects of the cold from direct contact of the ice with the beer pipe.

What I claim, and desire to secure by Letters Patent, is—

The ice-shield $f$, applied around the beer pipe and within the refrigerator, as and for the purposes set forth.

In witness whereof I have hereunto set my signature this 23d day of September, A. D. 1869.

M. REYNOLDS.

Witnesses:
CHAS. H. SMITH,
GEO. T. PINCKNEY.